Nov. 13, 1923.
G. L. MOORE
RECOIL CHECK
Filed July 29, 1920
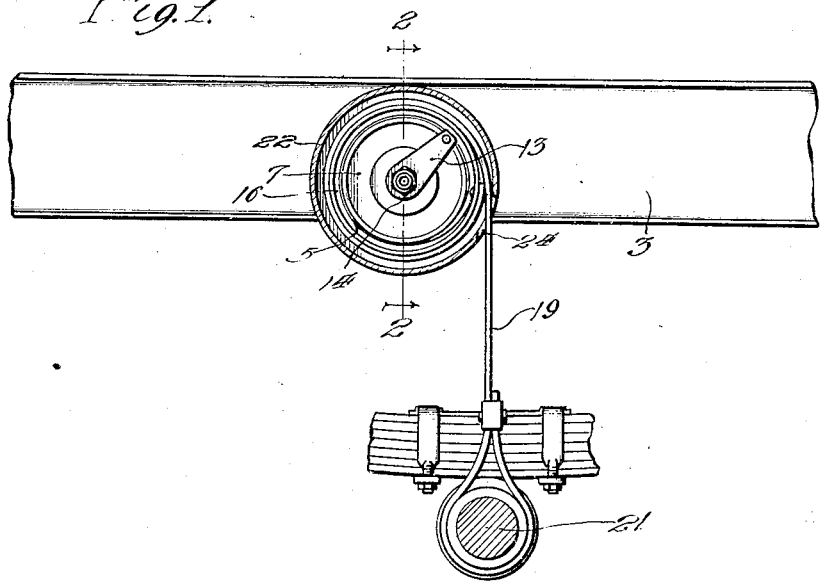
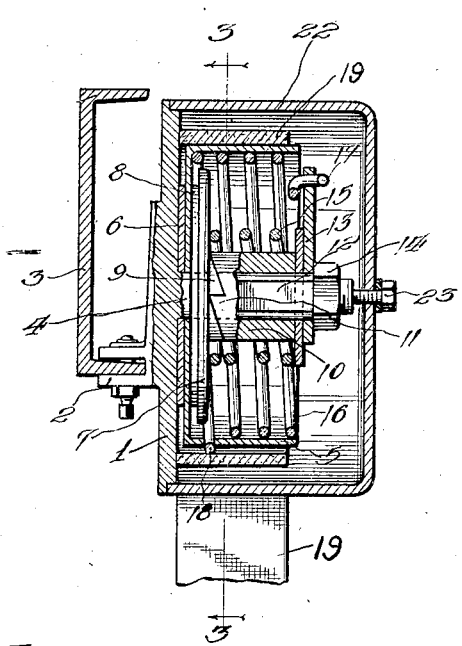
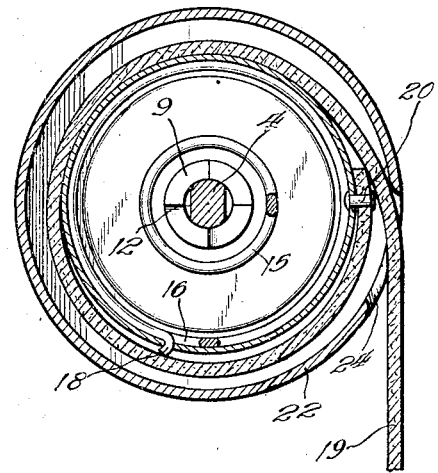
Witness:
Inventor
George L. Moore Patented Nov. 13, 1923.

1,473,638

UNITED STATES PATENT OFFICE.

GEORGE L. MOORE, OF CHICAGO, ILLINOIS.

RECOIL CHECK.

Application filed July 29, 1920. Serial No. 399,834.

*To all whom it may concern:*

Be it known that I, GEORGE L. MOORE, a citizen of the United States, residing at Chicago, county of Cook, State of Illinois, have invented a certain new and useful Improvement in Recoil Checks, and declare the following to be a full, clear, and exact description of the same, such as will enable others skilled in the art to which it pertains to make and use the same, reference being had to the accompanying drawings, which form a part of this specification.

My invention has for its object to produce a simple, compact, efficient and durable device adapted to be connected between two members, one of which is supported from the other by means of springs, and effectively reduce the recoil of the springs after they have been compressed.

A further object of the present invention is to produce a simple and novel recoil check in which there will be a constant area of frictional surfaces in contact with each other, the pressure between the co-operating friction surfaces varying with the intensity of the shock to be absorbed.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a side elevation of a device arranged in accordance with my invention, fragments of a vehicle axle and a vehicle frame between which the device is placed being shown, and the cover or housing being omitted from the frictional device;

Fig. 2 is a section on an enlarged scale on line 2—2 of Fig. 1; and

Fig. 3 is a section taken approximately on line 3—3 of Fig. 2.

Referring to the drawing, 1 represents a disc provided on one side with a suitable jaw, 2, or other attaching device by means of which the disc may be secured to one of the frame members, 3, of the body of a vehicle. On the other side of the disc, at the axis thereof, is a post, 4, cast integral with or otherwise rigidly secured to the disc. The post extends loosely through the bottom of a cup-shaped member, 5, of considerable diameter, the mouth of the cup being directed away from the disc; the bottom of the cup constituting a friction disc. Between the bottom of the cup and the disc there is preferably arranged a wearing plate, 6, in the form of a washer of considerable diameter having a central opening large enough to permit the free passage of the post. Within the cup is a second disc, 7, loose on the post. Between the disc, 7, and the bottom of the cup there is preferably a loose washer-like wearing plate, 8. Suitable means are provided between the post and the disc, 7, to force the latter against the bottom of the cup when said disc is turned in one direction. In the arrangement shown these means take the form of simple cam devices which I shall now describe. On the other side of the disc, 7, are a plurality of projecting cams or ratchet teeth, 9, arranged in a circle about the common axis of the several parts. On the post beyond the disc, 7, is a thick sleeve, 10, having at its inner end ratchet teeth or cams, 11, complementary to those on the disc 7. The member 10 is movable lengthwise of the post but is held against rotation thereon in any suitable way as, for example, by flattening the post in one or more zones as indicated at 12 and shaping the opening in the sleeve so as to give it the same cross sectional contour as that of the post. On the outer end of the post, beyond the sleeve, is fixed a radial arm, 13, a nut, 14, on the free end of the post preventing the arm from moving outwardly. A compression spring, 15, surrounds the sleeve, bearing at its inner end against the disc 7 and at its outer end against the arm 13, this spring being placed under an initial tension so as to press the disc, 7, toward the disc, 1. Within the cup is a torsion spring, 16, one end of which is fixed to the stationary arm, 13, as indicated at 17, while the other end is fixed to the cup as indicated at 18. A strap or other flexible member, 19, is wound through any desired angle, either more or less than 360 degrees, upon the cup, one end being riveted, as indicated at 20, to the cup, or being otherwise fastened thereto, while the other end is extended downwardly and attached in any suitable way to the axle, 21, of a vehicle. A suitable cup-shaped housing, 22, somewhat larger in interior diameter than the external diameter of the cup, 5, with the strap wound thereon, is placed over the member 5 with its mouth directed toward the disc 1; the casing or housing being conveniently held in place by means of a screw, 23, passing through the flat bottom of the housing into the free end of the post 4; and there being a slot, 24, through one side of the housing for the passage of the strap.

The torsion spring is so disposed that it tends constantly to wind up the strap upon the drum which the cylindrical portion of the cup 5 may be termed. Therefore, when the springs of the vehicle to which the device is attached are compressed, the slack in the strap is taken up by the recoil check. Then, as the recoil of the vehicle springs takes place, a pull is exerted on the strap in a direction to unwind it from the drum and, in unwinding, it turns the drum against the friction which exists between the members 1, 6, 7, 8 and the bottom of the cup-shaped drum. Consequently a frictional resistance is interposed to the rotation of the drum. This frictional resistance depends upon two factors one of which is the compression spring, 15, which exerts a uniform or constant pressure in the direction which causes the friction surfaces to be pressed together while the other is the co-operating ratchet teeth or cam devices on the disc 7 and the sleeve 10 respectively. These ratchet teeth or cam devices are so disposed that when the drum is turned by the unwinding strap the co-operating cams or teeth tend to ride up along each other, thus producing a wedging action between the disc 7 and the nut, 14, on the post in a direction tending to spread these two elements apart. The nut is immovable and therefore the thrust of the wedges is transmitted to the movable disc and the latter is pressed toward the stationary disc 1 with a greater force than simply that exerted by the compression spring, 15. This wedging action is itself the result of the friction between the disc 7 and the wearing plate, 8, so that the resultant frictional resistance of the device will depend upon the intensity or, in other words, the speed at which the recoil tends to take place.

It will thus be seen that I have provided a device in which the area of the friction surfaces in contact with each other remains constant at all times and in which there are two pressure-producing devices one of which exerts a constant pressure under all conditions while the other comes into play only when an increased pressure is needed.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a device of the character described, a stationary disc having a post projecting therefrom at the axis thereof, a cup-shaped drum loosely surrounding the post and frictionally engaged at the bottom thereof with the stationary disc, a disc loose on said post within the cup and engaging with the bottom thereof, a spring exerting an approximately constant pressure on the movable disc in a direction to force it toward said stationary disc, a shoulder on said post, and a cam device between said shoulder and the movable disc for forcing the movable disc toward the stationary disc when the movable disc is turned in one direction, a member connected to said drum for rotating the drum in the last named direction, and a spring acting on the drum and tending to hold it in a predetermined angular position.

2. In a device of the character described, a stationary disc, a second disc in frictional engagement with the stationary disc, a third disc in frictional engagement with the second disc, means for turning said second disc in one direction, and wedging means acting on the said third disc to force it with increasing pressure against said second disc when the third disc begins to turn with the second disc in the aforesaid direction.

3. In a device of the character described, a stationary disc, a second disc in frictional engagement with the stationary disc, a third disc in frictional engagement with the second disc, means for turning said second disc in one direction, wedging means acting on the said third disc to force it with increasing pressure against said second disc when the third disc begins to turn with the second disc in the aforesaid direction, and a spring acting to turn said second disc in the direction opposite to the aforesaid direction.

4. In a device of the character described, a stationary disc, a rotatable disc, cam devices acting on the aforesaid rotatable disc to force it toward the stationary disc when the rotatable disc is turned in one direction, a third disc lying between and in frictional engagement with and rotatable independently of each of the other two discs, means for turning the third disc in said direction, and a spring acting on said third disc and tending constantly to turn it in the opposite direction.

5. In a device of the character described, a stationary disc having a post projecting axially therefrom, a disc loose on said post, wedging means arranged between said post and said loose disc for forcing the latter toward the stationary disc when the loose disc is turned in one direction, a third disc loose on the post between and in frictional engagement with and rotatable independently of each of the other two discs, and means for turning said third disc in said direction.

6. In a device of the character described, a stationary disc having a post projecting axially therefrom, a disc loose on said post, wedging means arranged between said post and said loose disc for forcing the latter toward the stationary disc when the loose disc is turned in one direction, a third disc loose on the post between and in frictional engagement with and rotatable independently of each of the other two discs, means for turning said third disc in said direction, and a spring associated with said third disc and tending constantly to turn it in the opposite direction.

7. In a device of the character described, a stationary disc having a post projecting axially therefrom, a second disc rotatable on the post and engaging said stationary disc, a third disc rotatable on the post and in frictional engagement with said second disc, a shoulder on the post, a cam member fixed to the said third disc and facing said shoulder, a sleeve keyed to said post and abutting against said shoulder, said sleeve having a cam face co-operating with said cam element to force the third disc against the second disc when the latter is turned in one direction, and means for turning said second disc.

8. In a device of the character described, a stationary disc having a post projecting axially therefrom, a cup-shaped member loosely surounding said post and having its bottom engaged with the stationary disc, a disc loose on the post within the cup-shaped member and engaging the bottom of the latter; wedging means between said loose disc and the post acting to force the loose disc toward the stationary disc, and thus force the bottom of the cup-shaped member against the stationary disc, when the loose disc is turned in one direction, and a flexible member on the cup-shaped member for turning it in said direction.

9. In a device of the character described, a stationary disc having a post projecting axialy therefrom, a cup-shaped member loosely surrounding said post and having its bottom engaged with the stationary disc, a disc loose on the post within said member and engaging the bottom of the latter; wedging means between said loose disc and the post acting to force the loose disc toward the stationary disc, and thus force the bottom of the cup-shaped member against the stationary disc, when the loose disc is turned in one direction; a flexible member on the cup-shaped member for turning it in said direction, and a torsion spring housed within the cup-shaped member and tending constantly to turn the latter in the opposite direction when it is turned in the aforesaid direction.

10. In a device of the character described, a stationary disc having a post projecting axially therefrom, a second disc loose on said post and engaging the stationary disc, a third disc loose on the post and engaging the second disc, co-operating cam devices fixed respectively to the third disc and to the post and adapted to force the third disc against the second disc and the second disc against the first disc when the third disc is turned in one direction, and means for turning the said second disc in said direction.

11. In a device of the character described, a stationary disc, a rotatable disc in frictional engagement with the stationary disc, an abutment, and a wedging means between said rotatable disc and said abutment constructed and arranged to press the rotatable disc against the stationary disc, said wedging means including a part rotatable relatively to and in frictional engagement with the rotatable disc so as to be frictionally driven by the rotatable disc when the latter is rotated.

12. In a device of the character described, a rotatable disc, a second disc frictionally engaged with one face of the rotatable disc. said second disc having capacity for rotating independently of the other disc, means associated with said second disc to force the latter against said rotatable disc with a gradually increasing pressure when the second disc begins to turn with the rotatable disc. and means associated with the rotatable disc for resisting the thrust of said second disc against the same.

In testimony whereof, I sign this specification.

GEORGE L. MOORE.